United States Patent [19]
Ohtomo et al.

[11] Patent Number: 6,068,060
[45] Date of Patent: May 30, 2000

[54] CONSTRUCTION EQUIPMENT CONTROL SYSTEM

[75] Inventors: Fumio Ohtomo; Satoshi Hirano; Kunihiro Hayashi, all of Tokyo-to, Japan

[73] Assignee: Kabushiki Kaisha Topcon, Tokyo-to, Japan

[21] Appl. No.: 09/259,484

[22] Filed: Feb. 26, 1999

[30] Foreign Application Priority Data

Jun. 6, 1998 [JP] Japan .................................. 10-073322

[51] Int. Cl.<sup>7</sup> ...................................................... E02F 3/76
[52] U.S. Cl. ............................................. 172/4.5; 701/50
[58] Field of Search ............................... 701/50; 172/4.5, 172/2, 4

[56] References Cited

U.S. PATENT DOCUMENTS 4,807,131  2/1989  Clegg .
5,703,718  12/1997  Ohtomo et al. ......................... 359/494
5,745,623  4/1998  Ohtomo et al. ........................... 385/88
5,960,551  10/1999  Nishi et al. ............................... 33/292

*Primary Examiner*—Christopher J. Novosad
*Attorney, Agent, or Firm*—Nields, Lemack & Dingman

[57] ABSTRACT

The present invention provides a construction equipment control system, comprising a rotary laser irradiating system for forming a laser beam reference plane by the laser beam and capable to tilt the laser beam reference plane, a level sensor installed on a ground leveling tool of construction equipment and for performing photodetection of the laser beam to give instruction on a height of the ground leveling tool, a GPS receiving system for detecting a position of the construction equipment, and a control device for controlling a gradient of the laser beam reference plane formed by the rotary laser irradiating system based on the detection result of the position of the construction equipment by the GPS receiving system, whereby ground leveling operation for a horizontal surface, an inclined surface and a curved surface can be performed by measuring the position of the construction equipment at real time and by controlling the height of the ground leveling tool based on working data.

8 Claims, 6 Drawing Sheets

CONSTRUCTION EQUIPMENT CONTROL SYSTEM

BACKGROUND OF THE INVENTION

The present invention relates to a construction equipment control system used in civil engineering work such as ground leveling, and in particular, to a construction equipment control system utilizing a laser reference plane formed by rotary irradiation a of laser beam in order to control the height in ground leveling operation.

When ground leveling operation is performed for construction work such as development of housing area or road pavement using construction equipment for ground leveling, e.g. grader, bulldozer, etc., it is necessary to have a reference for the height of ground leveling. In recent years, in order to determine such height, which serves as a reference in ground leveling operation, a system using a laser beam has been propagated. As one of such systems using the laser beam, there is a control system for construction equipment provided with a rotary laser irradiating system.

FIG. 6 shows a case where the control system for construction equipment is adopted for a bulldozer.

In FIG. 6, reference numeral 1 represents a rotary laser irradiating system, and 2 a bulldozer, and the rotary laser irradiating system 1 is installed on a tripod 3 at a predetermined position in a housing area under development. The rotary laser irradiating system 1 irradiates the laser beam 4 in a horizontal direction and rotates it and forms a reference plane by the laser beam 4.

The bulldozer 2 has a blade 5, which is supported in such manner that it can be moved up or down, and a pole 6 is erected on the blade 5. A level sensor 7 is mounted on the pole 6. The level sensor 7 receives the laser beam 4 from the rotary laser irradiating system 1 and detects a photodetecting position. The bulldozer 2 is provided with a control device (not shown) which detects the height of the blade 5 based on a photodetection signal from the level sensor 7, and controls the height of the blade 5 based on the result of detection.

As described above, a horizontal reference plane is formed by the laser beam, and it is possible to perform grounding leveling and to form a horizontal surface by keeping a distance between the horizontal reference plane and a blade edge 5a of the blade 5. By varying the distance with respect to the blade edge 5a, it is possible to change the height of the ground surface to be leveled.

Ground leveling is performed not only to level the ground to a horizontal surface. In many cases, it is rather necessary to perform ground leveling to form an inclined surface. In the construction work to develop housing area, it is necessary to maintain a gradient suitable for water drainage. In the work to pave road, it is necessary to keep a gradient suitable for the specific topography and for water drainage. In conventional type construction equipment control system, it has been practiced to perform ground leveling to produce a flat plane at first and then to form an inclined ground surface with a predetermined gradient based on the result of surveying operation.

In this respect, by the conventional type construction equipment control system as described above, it is possible to perform ground leveling and to produce the horizontal ground surface without requiring skill of an experienced operator, while it has been a work difficult to perform and requiring high grade of skill to keep a gradient on the leveled ground surface. The finishing results of the leveling of inclined ground surface depend much on the skill of the operator, and the progress of the work varies according to the skill of each operator, and there are also the problems in the finished ground surface and process control.

SUMMARY OF THE INVENTION

It is an object of the present invention to provide a construction equipment control system, by which it is possible to perform ground leveling including the leveling of inclined ground surface easily and efficiently without being influenced by skill and experience of the operator.

To attain the above object, the construction equipment control system according to the present invention comprises a rotary laser irradiating system for forming a laser beam reference plane by the laser beam and capable to tilt the laser beam reference plane, a level sensor installed on a ground leveling tool of construction equipment and for performing photodetection of laser beam to give instruction on a height of the ground leveling tool, a GPS receiving system for detecting a position of the construction equipment, and a control device for controlling a gradient of the laser beam reference plane formed by the rotary laser irradiating system based on the detection result of the position of the construction equipment by the GPS receiving system. Also, in the construction equipment control system according to the present invention, the control device comprises a storage unit for storing at least working data, and an arithmetic unit for calculating the position of the construction equipment based on the receiving result of the GPS receiving system, and the rotary laser irradiating system is controlled according to the calculated position of the construction equipment and the working data. Further, in the construction equipment control system according to the present invention, the rotary laser irradiating system forms the laser beam reference plane by performing reciprocal scanning toward the level sensor. In the construction equipment control system according to the present invention, the GPS receiving system has a first GPS receiver and a second GPS receiver, and the first GPS receiver is installed on the construction equipment, and the second GPS receiver is mounted at a known point. Also, the construction equipment control system according to the present invention further comprises another GPS receiving system for detecting a position of the rotary laser irradiating system. Further, in the construction equipment control system according to the present invention, the rotary laser irradiating system forms the reference plane by irradiating the laser beam only within the photodetection range of the level sensor. In the construction equipment control system according to the present invention, the direction of the rotary laser irradiating system is aligned with the level sensor, and the control device is initialized by said alignment. Further, in the construction equipment control system according to the present invention, the rotary laser irradiating system comprises a photodetection unit, the photodetection unit detects a reflected laser beam from the level sensor, the control device aligns the direction of the rotary laser irradiating system with the level sensor based on the result of detection by the photodetection unit, and the control device is initialized by said alignment.

DETAILED DESCRIPTION OF THE PREFERRED EMBODIMENT

In the following, description will be given on an embodiment of the present invention referring to the attached drawings.

Figure 1:
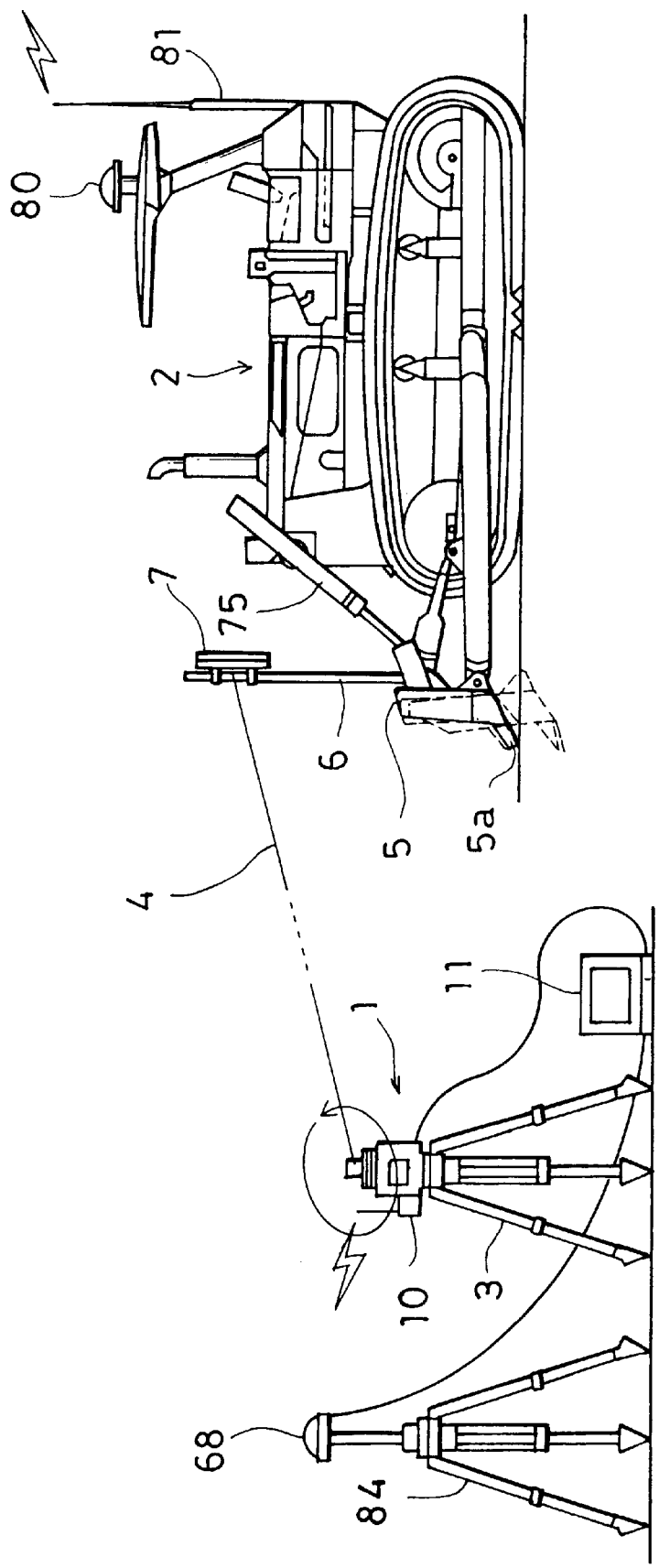
FIG. 1 is a drawing to explain an embodiment of the present invention.
Figure 6:
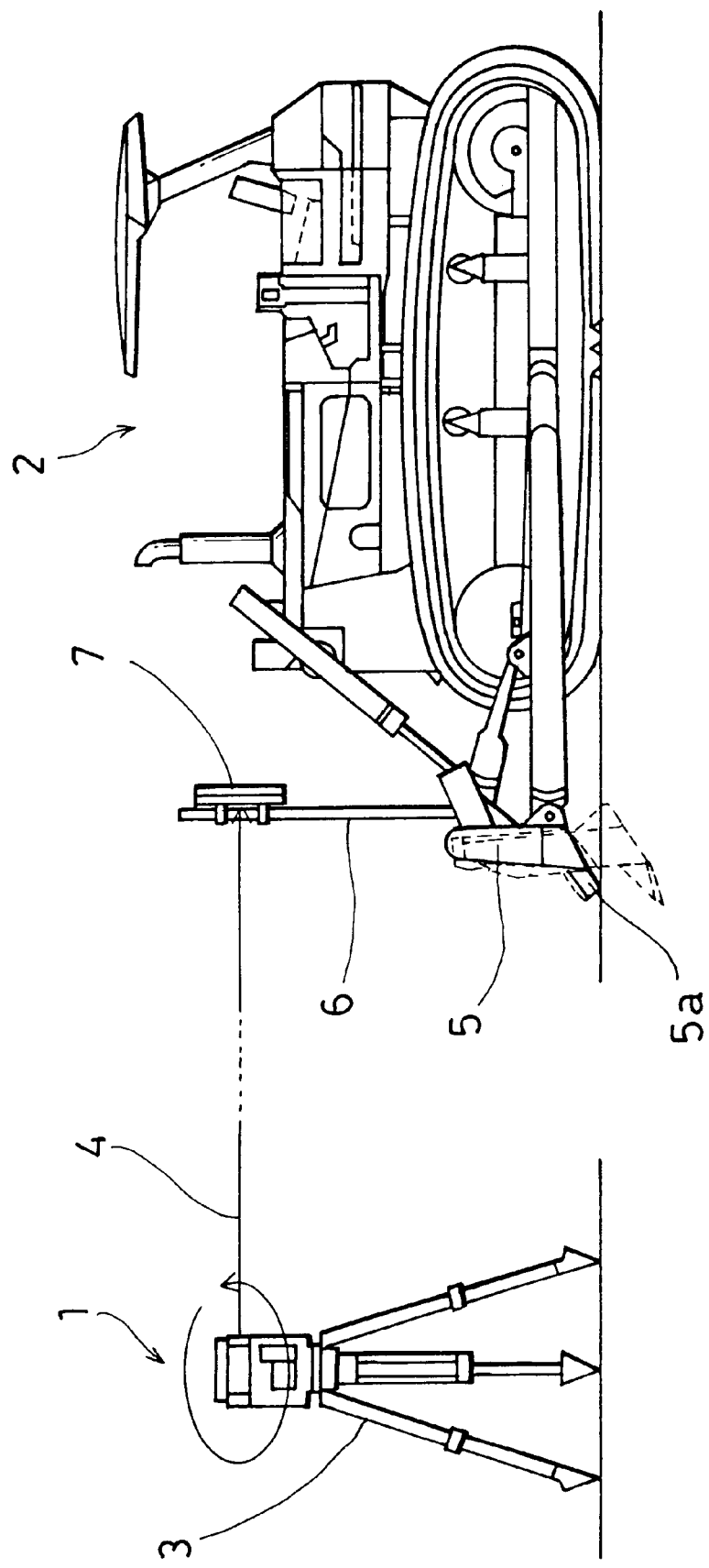
FIG. 6 is a drawing to explain a conventional system.

In FIG. 1, the same component as in FIG. 6 is referred by the same symbol, and detailed description is not given here.

The present invention provides a control system for construction equipment such as bulldozer by combining a rotary laser irradiating system capable to form a tilted reference plane and a global positioning system (GPS).

A rotary laser irradiating system 1 comprises a tilting mechanism for tilting projecting direction of the laser beam 4 and a control unit for controlling the tilting mechanism. Thus, it is possible to tilt the projecting direction of the laser beam 4, and a tilted reference plane can be formed by the laser beam 4. Further, a radio receiver 10 is provided on the rotary laser irradiating system 1, and receiving data of the radio receiver 10 is sent to a control device 11 which is to be described later. To the control device 11, the rotary laser irradiating system 1 is connected.

Figure 2:
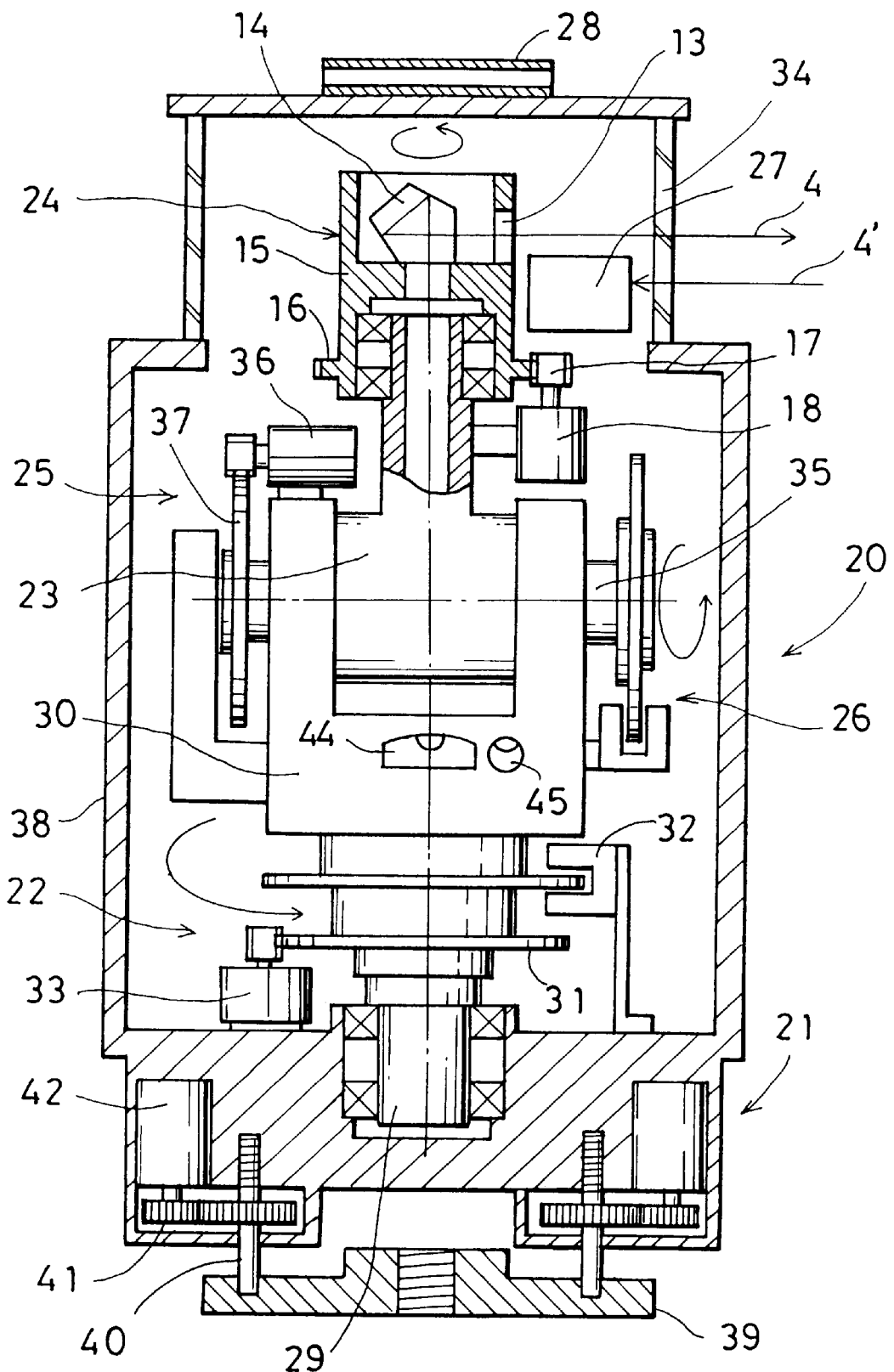
FIG. 2 is a cross-sectional view to explain mechanism of a rotary laser irradiating system used in the above embodiment.
Figure 3:
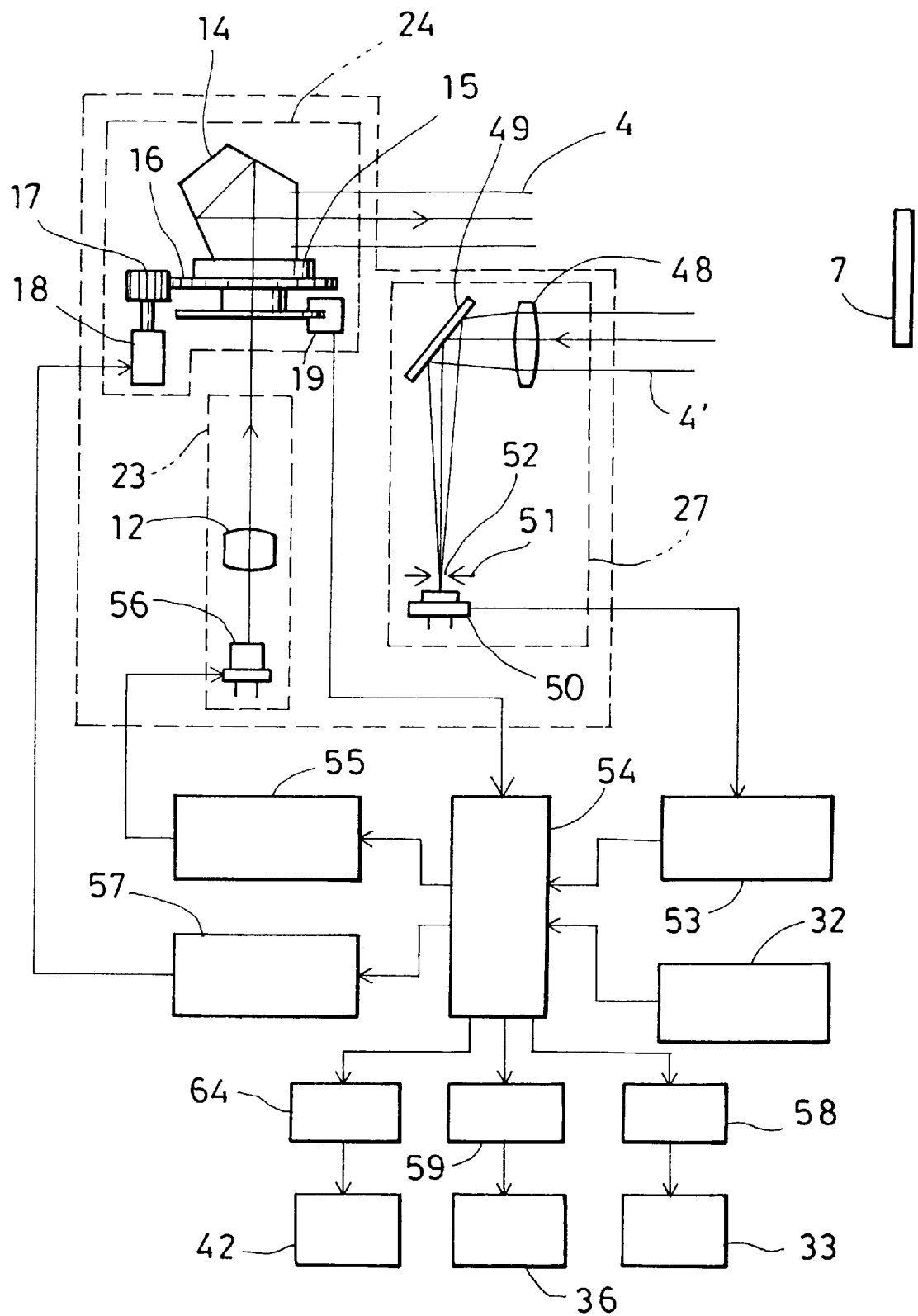
FIG. 3 is a block diagram of the rotary irradiating laser system.

Now, description will be given on the rotary laser irradiating system 1, referring to FIG. 2 and FIG. 3.

A rotary laser irradiating system main unit 20 is installed on a tripod 3 via a leveling unit 21 which is arranged at lower position.

Further, the rotary laser irradiating system main unit 20 primarily comprises a light emitter 23 for emitting the laser beam 4, a rotator 24 for performing rotary irradiation of the laser beam 4 within a reference plane, a rotating unit 22 for rotating the light emitter 23 around a vertical axis, a tilt setting unit 25 for tilting the light emitter 23 around a horizontal axis and for setting tilting of the reference plane formed by the laser beam 4, and a tilt detecting unit 26 for detecting a tilt angle, a photodetection unit 27 for detecting a reflection light from the level sensor 7, and the leveling unit 21 for performing leveling of the rotary laser irradiating system main unit 20.

On the top surface of the rotary laser irradiating system main unit 20, a collimator 28 is arranged. By this collimator 28, it is possible to roughly set the direction of the rotary laser irradiating system main unit 20 with respect to the level sensor 7. On the upper portion of the rotary laser irradiating system main unit 20, there is provided a photodetection window 34, through which the laser beam 4 from the rotator 24 is irradiated. A reflection laser beam 4' reflected by the level sensor 7 enters through the photodetection window 34 and is received by the photodetection unit 27 disposed inside the rotary laser irradiating system main unit 20.

At the bottom of a casing 38 of the rotary laser irradiating system main unit 20, a main unit frame 30 is rotatably arranged around the vertical axis via a vertical axis unit 29, and a rotating unit gear 31 is mounted concentrically with the vertical axis unit 29, and a rotating unit encoder 32 is also provided. A rotating unit motor 33 is provided at a position closer to the casing 38, and an output shaft of the rotating unit motor 33 is engaged with the rotating unit gear 31. When the rotating unit motor 33 is driven, the main unit frame 30 is rotated via the rotating unit gear 31. A rotation angle is detected by the rotating unit encoder 32, and the result of detection is inputted to a control unit (CPU) 54.

At the bottom of the casing 38, the leveling unit 21 is arranged. The leveling unit 21 comprises a fixed baseplate 39 to be fixed on the tripod 3 and leveling screws 40 provided between the fixed baseplate 39 and the bottom of the casing 38. There are provided three leveling screws 40, each positioned at a vertex of a triangle. Upper end of each of the leveling screws is engaged with the casing 38, and the lower end is rotatably fitted to the fixed baseplate 39. The leveling screws 40 are connected to a leveling motor 42 via a gear train 41. When the leveling screws 40 are rotated by the leveling motor 42 via the gear train 41, a gap between the casing 38 and the fixed baseplate 39 is varied, and the rotary laser irradiating system main unit 20 can be tilted in any direction as desired. Tilting of the rotary laser irradiating system main unit 20 is detected by tilt sensors 44 and 45 provided on the main unit frame 30 and leveling operation is performed by feedback of the results of the detection by the tilt sensors 44 and 45 to the driving of the leveling motor 42. One of the three leveling screws 40 may not be provided and this one may be used merely as a tiltable supporting point.

The light emitter 23 is rotatably mounted on the main unit frame 30 via a horizontal tilting shaft 35, and a tilting motor 36 is arranged on the main unit frame 30. The tilting motor 36 and the tilting shaft 35 are connected with each other via a gear train 37. On the tilting shaft 35, a tilt detecting unit 26 for detecting tilt angle of the light emitter 23 is mounted. The tilt detecting unit 26 comprises an encoder, for example. When the tilting motor 36 is driven, the light emitter 23 can be tilted via the gear train 37, and the tilt angle is detected by the tilt detecting unit 26.

On the upper end of the light emitter 23, the rotator 24 is rotatably mounted. A scanning gear 16 is disposed on the rotator 24 and is engaged with a driving gear 17 of a scanning motor 18, which is fixed on the light emitter 23. When the driving gear 17 is driven, the rotator 24 is rotated.

The rotator 24 is rotated in such manner that the optical axis of the laser beam 4 entering from the light emitter 23 is deflected by an angle of 90° using a pentagonal prism 14 and a laser plane is formed as the laser beam passes through a projection window 13. The pentagonal prism 14 is positioned on a rotation support member 15, which is rotated around the optical axis of the light emitter 23, and the rotation support member 15 is connected to the scanning motor 18 via the driving gear 17. The rotating condition of the rotation support member 15 is detected by an encoder 19 mounted on the rotation support member 15, and detection signal of the encoder 19 is inputted to the control unit 54.

The tilt angle of the light emitter 23 is detected by the tilt detecting unit 26, which is mounted on the tilting shaft 35 of the light emitter 23. The tilt detecting unit 26 is provided with an encoder, and output signal from the encoder is inputted to the control unit 54. Based on the signal from the tilt detecting unit 26, the control unit 54 calculates tilting of the light emitter 23 until it reaches a predetermined tilt angle. The tilting motor 36 is driven by a tilting motor driving unit 59, and tilt can be set by driving the tilting motor 36 until the output of the tilt detecting unit 26 reaches a predetermined tilt angle.

The photodetection unit 27 may be fixed on the casing 38. More preferably, it is mounted on the light emitter 23 so that it can be tilted integrally with the light emitter 23. Now, description will be given on the photodetection unit 27.

A condenser lens 48 is provided at a position opposite to the photodetection window 34, and a reflection mirror 49 is arranged on the optical axis of the condenser lens 48. The optical axis of the condenser lens 48 runs in parallel to a reference plane, which is formed by rotation of the laser beam 4. Below the reflection mirror 49, a photodetection element 50 is disposed and the reflected laser beam 4' is converged on the photodetection element 50. In front of the photodetection element 50, a mask 51 is arranged. The mask 51 interrupts incident noise light entering the photodetection element 50, and a slit 52 is formed, which is designed long in a scanning direction of the reflected laser beam 4' (long in a direction perpendicular to the paper surface).

Photodetection signal from the photodetection element 50 is inputted to a reflection light detecting unit 53, and the reflecting condition of the laser beam 4 at the level sensor 7 as detected by the reflection light detecting unit 53 is inputted to the control unit 54. To the control unit 54, a signal from the rotating unit encoder 32 is inputted. The control unit 54 drives a laser diode 56 via a light-emitting element driving unit 55, drives the scanning motor 18 via a scanning motor driving unit 57, drives the rotating unit motor 33 via a rotating unit motor driving unit 58, drives the tilting motor 36 via a tilting motor driving unit 59, and drives the leveling motor 42 via a leveling motor driving unit 64 based on the signals from the tilt sensors 44 and 45.

Based on the signal from the reflection light detecting unit 53 or the signal from the tilt detecting unit 26, the encoder 19 and the rotating unit encoder 32, the control unit 54 displays information relating to a reference plane formed by the laser beam 4 such as direction, tilt, etc. of the rotary laser irradiating system main unit 20 on a display unit (not shown) of the rotary laser irradiating system main unit 20. For example, it displays an information as to which direction and at what angle the rotary laser irradiating system main unit 20 is rotated with respect to the level sensor 7 or an information on tilt angle, tilting direction, etc. of the reference plane.

Figure 4:
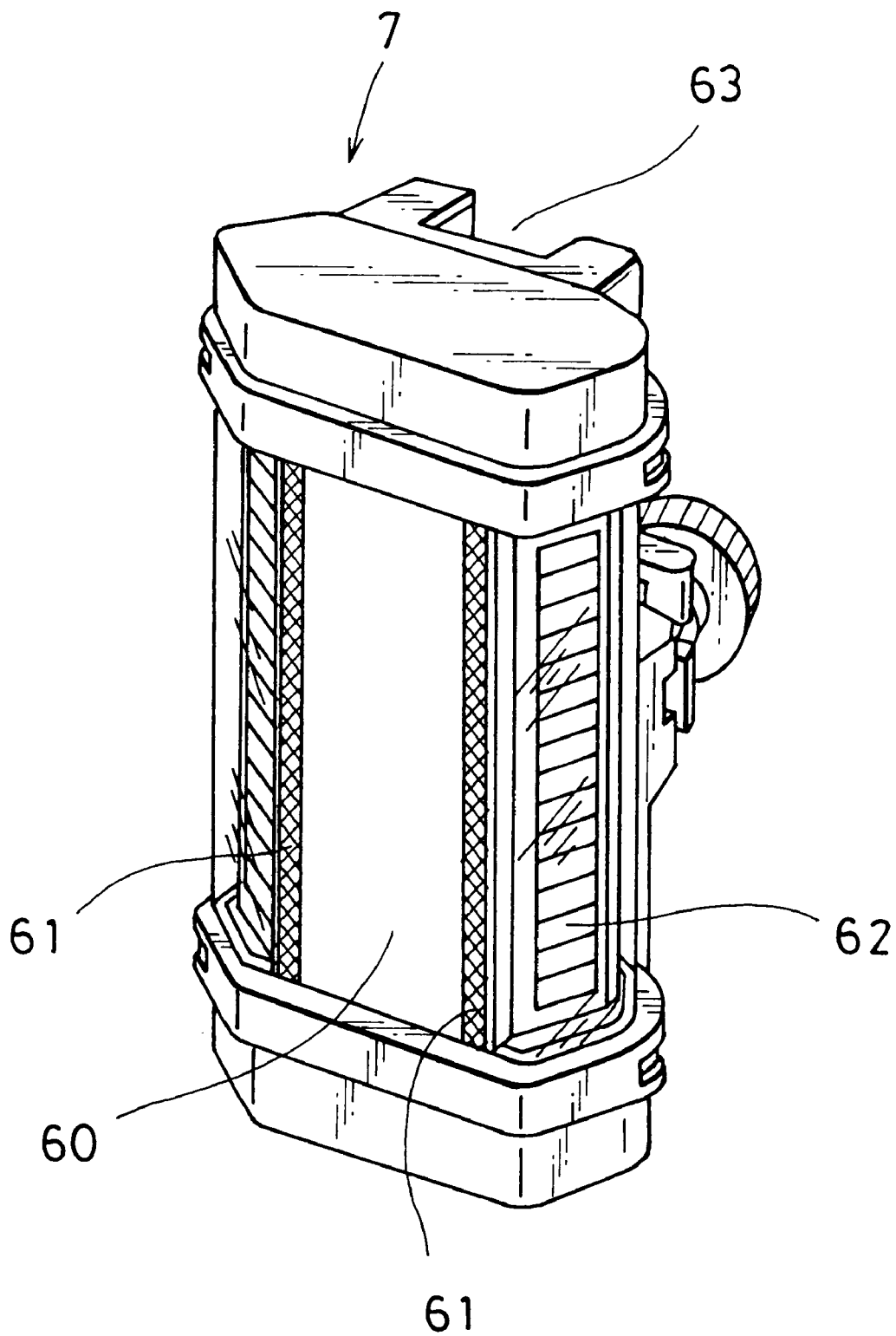
FIG. 4 is a perspective view of a level sensor used together with the rotary laser irradiating system.

Next, description will be given on the level sensor 7 referring to FIG. 4.

A band-like reflection sector 61 designed long in a vertical direction is arranged on each of left and right sides of the level sensor 7. A portion in between the two reflection sectors 61 is a non-reflection sector 60. On further outer side of each of the reflection sectors 61, a photodetection element 62 in band-like shape and extended in the vertical direction is disposed. The photodetection element 62 is provided at a certain angle with respect to the reflection sector 61. On the back side, a groove 63 to be engaged with the pole 6 is formed, and the level sensor 7 is installed with the pole 6 engaged with the groove 63.

Figure 5:
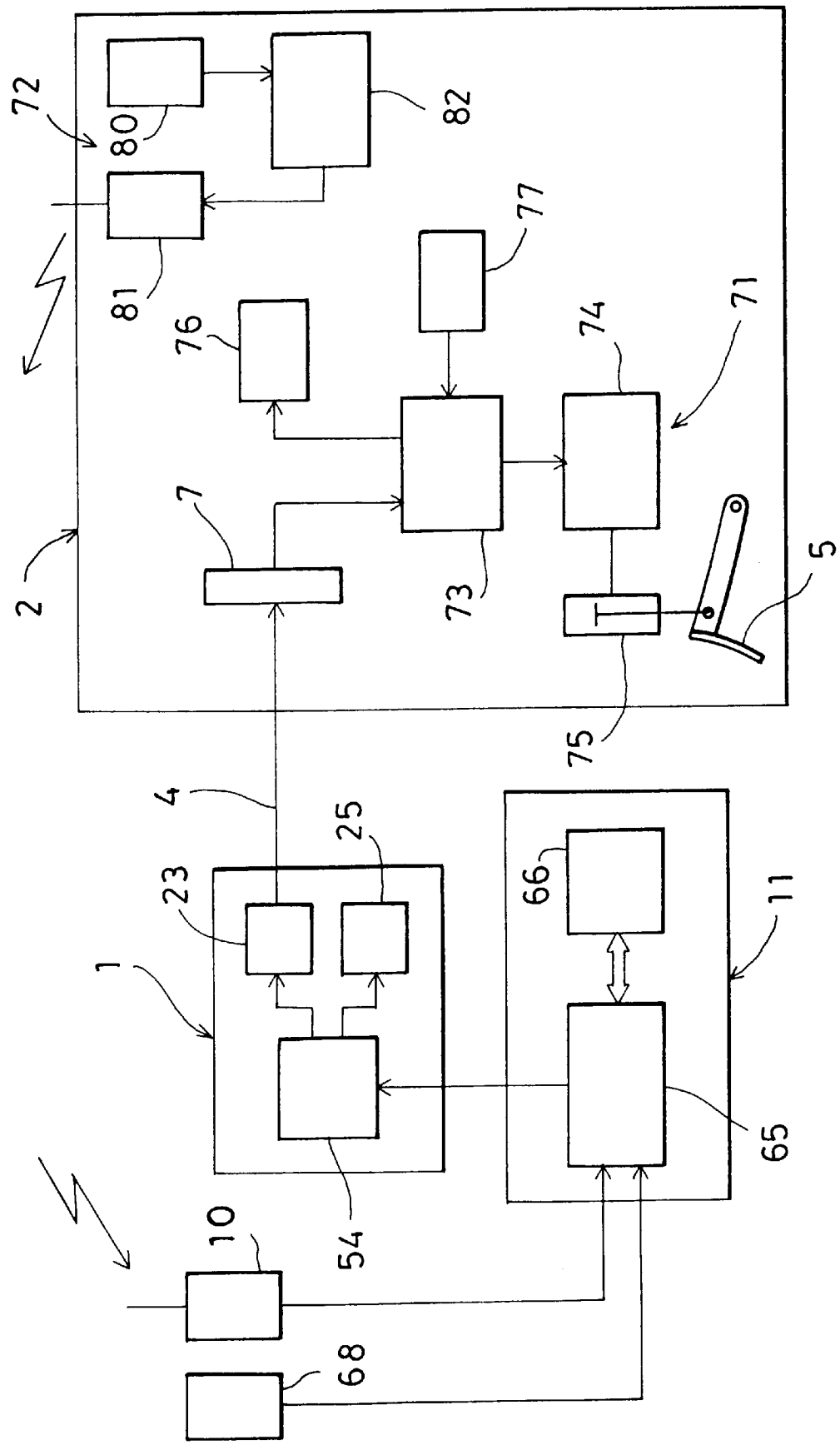
FIG. 5 is a block diagram of the embodiment of the present invention.

Now, the control device 11 will be described referring to FIG. 5.

The control device 11 is typically represented by a personal computer. The control device 11 comprises an arithmetic unit 65 and a storage unit 66. A program for arithmetic processing is preset and inputted in the storage unit 66. Also, a program for calculating topographical data based on working drawings, i.e. a height of ground surface with respect to plane coordinates and a position of the bulldozer 2, is preset and inputted. Further, the data such as an equipment height of the rotary laser irradiating system 1, a distance from a blade edge 5a to the standard position of the level sensor 7, etc. are preset and inputted.

To the control device 11, a signal received from a second GPS receiver 68 as described later is inputted, and also, a signal received from a radio receiver 10 as described later is inputted. By the above arithmetic programs, the position of the bulldozer 2 can be calculated from the receiving signals.

Further, from the calculation results and the topographical data based on the working drawings, which are preset and inputted, a tilt angle of the laser beam 4 emitted from the rotary laser irradiating system main unit 20 is calculated, and a command is issued to the control unit 54 of the rotary laser irradiating system main unit 20 based on the results of calculation.

The bulldozer 2 comprises a blade driving unit 71 for controlling a position of the blade 5 and a radio transmitter/receiver 72.

First, description will be given on the blade driving unit 71.

The level sensor 7 is mounted on the pole 6, and a distance between the blade edge 5a of the blade 5 and the standard position of the level sensor 7 is a value already known. A detection signal of the laser beam 4 by the level sensor 7 is inputted to an arithmetic unit 73. On the arithmetic unit 73, a height of the blade edge 5a is calculated, and the arithmetic unit 73 drives a hydraulic cylinder 75 via an electric/hydraulic circuit 74 to move the blade 5 up and down and determines the position. The electric/hydraulic circuit 74 comprises electromagnetic valves. The arithmetic unit 73 issues an open/close control command to the electric/hydraulic circuit 74 in accordance with a predetermined sequence. By opening or closing the electromagnetic valves via the electric/hydraulic circuit 74, supply or discharge of pressure fluid to or from the hydraulic cylinder 75 or flowrate regulation is controlled and the hydraulic cylinder 75 is moved up or down in a desired direction and at a desired speed. A display unit 76 is connected to the arithmetic unit 73, and position of the blade or digging condition by the blade 5 is displayed.

Reference numeral 77 represents an operation unit, and it can directly perform manual operation according to the display on the display unit 76. While watching the display on the display unit 76, positioning operation of the blade 5 is performed by manual operation. A signal from the operation unit 77 is inputted to the arithmetic unit 73, and the arithmetic unit 73 drives the hydraulic cylinder 75 via the electric/hydraulic circuit 74 based on the input signal.

Next, description will be given on the radio transmitter/receiver 72.

A first GPS receiver 80 is installed at a position, e.g. on the roof of the bulldozer 2, where there is no obstacle to interrupt radio waves coming from satellite. By a signal processor 82, signal processing such as amplification is performed on the information received by the first GPS receiver 80, and the information is transmitted to the radio receiver 10 from a transmitter 81.

A second GPS receiver 68 is installed on a tripod 84 at a position which is closer to the rotary laser irradiating system 1 and serves as a reference point. The receiving result of the second GPS receiver 68 and the receiving result of the radio receiver 10 are inputted to the control device 11. By the first GPS receiver 80 and the second GPS receiver 68, the position of the bulldozer 2 is detected by cinematic surveying. The first GPS receiver 80, the second GPS receiver 68 and the control device 11 constitute a surveying system, and the radio transmitter/receiver 72, the second GPS receiver 68, and the radio receiver 10 constitute a data communication system.

In the following, description will be given on operation of the system.

The second GPS receiver 68 is installed at a known point, and the rotary laser irradiating system 1 is also installed at a known point.

After the installation, leveling for the rotary laser irradiating system 1 is performed first. The leveling is performed by cooperative operation of tilt adjustment by the tilt setting unit 25 and horizontal detection of the tilt sensors 44 and 45. When the leveling operation has been completed, the direction of the rotary laser irradiating system main unit 20 is aligned with the level sensor 7 and initialization is performed. The initialization is required because a tilting direction of the rotary laser irradiating system main unit 20 does not agree at first with the setting of the control device 11. For the initialization, the rotary laser irradiating system main unit 20 installed at a known point is directed toward the level sensor 7 of the bulldozer 2, the data of which are already known by the GPS receivers 80 and 68. In order to detect the level sensor 7, the laser beam 4 is rotated for scanning. The reflected laser beam 4' from the level sensor 7 is detected by the photodetection unit 27. Based on the result of detection, the control unit 54 rotates the rotating unit 22 and turns it toward the level sensor 7. In case initialization is performed manually, the collimator 28 is collimated, and the rotating unit 22 and the tilt setting unit 25 are operated. In case of manual operation, there is no need to use the photodetection unit 27 and the like.

The information received by the radio receiver 10 and the signal received by the second GPS receiver 68 are inputted to the control device 11. At the control device 11, the position of the bulldozer 2 is surveyed. The result of the surveying is an information on plane position of the bulldozer 2. The control device 11 calculates a gradient of the laser beam 4 by the arithmetic unit 65 based on the plane position information and the working data inputted in the storage unit 66.

The calculation result is inputted to the control unit 54 of the rotary laser irradiating system 1. The control unit 54 drives and controls the tilt setting unit 25 so that the reference plane formed by the laser beam 4 will have the calculated gradient. Based on the signal from the control unit 54, the tilt setting unit 25 drives the tilting motor 36 and tilts the light emitter 23 by rotating the tilting shaft 35 via the gear train 37. By the tilting of the light emitter 23, the laser beam 4 irradiated by rotary irradiation from the rotor 24 is tilted, and the reference plane formed by the laser beam 4 has now the predetermined gradient.

When the setting of the tilting direction and the gradient of the laser beam 4 has been completed, positioning of the blade 5 is performed.

Based on the receiving signal from the level sensor 7, the arithmetic unit 73 detects photodetecting position on the level sensor 7. After comparatively calculating the photodetecting position and the reference position, if there is any deviation, a drive control signal is issued to the electric/hydraulic circuit 74 to correct the deviation. The electric/hydraulic circuit 74 drives the hydraulic cylinder 75 and moves the blade 5 up and down. Because the level sensor 7 is moved up and down integrally with the blade 5, the amount of upward or downward movement of the blade 5 agrees with the amount of upward or downward movement of the level sensor 7. When the photodetecting position on the level sensor 7 concurs with the reference position, the position of the blade 5 is determined.

Ground leveling operation is performed by moving the bulldozer 2. The data received by the first GPS receiver 80 is transmitted to the radio receiver 10 by the transmitter 81. Further, receiving data from the second GPS receiver 68 is inputted to the control device 11. As a result, the control device 11 calculates the position of the bulldozer 2.

Height and tilting of the leveled ground surface at the position of the bulldozer 2 are calculated according to the working data. In case the leveled ground surface is an inclined surface with a constant gradient, ground leveling can be performed without changing the gradient of the reference plane formed by the rotary laser irradiating system main unit 20. In case it is a curved surface, the ground can be leveled to a curved surface by changing the gradient of the reference plane formed by the laser beam as the bulldozer 2 is moved.

According to the present system, it is possible to automatically perform ground leveling in accordance with the working data. Also, operator may perform ground leveling operation manually based on the data displayed on the display unit 76.

In the above embodiment, the level sensor 7 is provided on the blade 5, while the level sensor 7 may be installed on a body of the bulldozer 2 if it is designed in such manner that the position of the blade edge 5a can be detected according to extension or shrinking of the hydraulic cylinder 75 or by the position of an arm which is supporting the blade 5. The above explanation has been given on the GPS measuring system of cinematic type, while it is needless to say that GPS measuring system of any other type may be used if moving point can be immediately detected. It may be designed in such manner that reciprocal scanning is performed over the full range of the level sensor 7 based on the output of the encoder 19 for detecting rotating position of the rotator 24, or the laser beam may be rotated by limiting the emission of the laser beam within the range of the level sensor 7.

As described above, when ground leveling operation is performed in accordance with the reference plane formed by the laser beam, it is possible according to the present invention to easily and reliably produce not only a horizontal surface but also an inclined surface or a curved surface without requiring skill of experienced operator and to reduce the time needed for construction work.

What is claimed are:

1. A construction equipment control system, comprising a rotary laser irradiating system for forming a laser beam reference plane by the laser beam and capable to tilt the laser beam reference plane, a level sensor installed on a ground leveling tool of construction equipment and used for performing photodetection of the laser beam to give instruction on a height of the ground leveling tool, a GPS receiving system for detecting a position of said construction equipment, and a control device for controlling a gradient of said laser beam reference plane formed by said rotary laser irradiating system based on the detection result of the position of said construction equipment by said GPS receiving system.

2. A construction equipment control system according to claim 1, wherein said control device comprises a storage unit for storing at least working data, and an arithmetic unit for calculating the position of said construction equipment based on the receiving result of said GPS receiving system, and said rotary laser irradiating system is controlled according to the calculated position of the construction equipment and said working data.

3. A construction equipment control system according to claim 1, wherein said rotary laser irradiating system forms a laser beam reference plane by performing reciprocal scanning toward the level sensor.

4. A construction equipment control system according to claim 1, wherein said GPS receiving system comprises a first GPS receiver and a second GPS receiver, and said first GPS receiver is mounted on the construction equipment, and the second GPS receiver is installed at a known point.

5. A construction equipment control system according to claim 1, further comprising another GPS receiving system for detecting a position of said rotary laser irradiating system.

6. A construction equipment control system according to claim 1, wherein said rotary laser irradiating system forms a reference plane by irradiating the laser beam only within photodetection range of the level sensor.

7. A construction equipment control system according to claim 1, wherein the direction of said rotary laser irradiating system is aligned with said level sensor, and said control device is initialized by said alignment.

8. A construction equipment control system according to claim 7, wherein said rotary laser irradiating system comprises a photodetection unit, said photodetection unit detects a reflected laser beam from said level sensor, said control device aligns the direction of said rotary laser irradiating system with said level sensor based on the result of detection by said photodetection unit, and said control device is initialized by said alignment.

* * * * *